United States Patent
Yamazaki (10) Patent No.: US 8,852,294 B2
(45) Date of Patent: Oct. 7, 2014

(54) POWER STORAGE DEVICE AND METHOD FOR MANUFACTURING THE SAME

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 436 days.

(21) Appl. No.: 13/101,598

(22) Filed: May 5, 2011

(65) Prior Publication Data

US 2011/0292564 A1    Dec. 1, 2011

(30) Foreign Application Priority Data

May 28, 2010   (JP) ................ 2010-122770

(51) Int. Cl.
| | |
|---|---|
| *H01G 9/00* | (2006.01) |
| *H01G 11/86* | (2013.01) |
| *H01G 11/30* | (2013.01) |
| *H01G 11/26* | (2013.01) |
| *H01G 11/70* | (2013.01) |
| *H01G 9/04* | (2006.01) |
| *H01G 9/008* | (2006.01) |
| *H01G 11/28* | (2013.01) |
| *H01G 11/84* | (2013.01) |
| *H01G 11/12* | (2013.01) |
| *H01G 11/50* | (2013.01) |

(52) U.S. Cl.
CPC ............ *H01G 11/28* (2013.01); *H01G 11/86* (2013.01); *Y02E 60/13* (2013.01); *H01G 11/30* (2013.01); *H01G 11/26* (2013.01); *H01G 11/70* (2013.01); *H01G 11/50* (2013.01); *H01G 9/058* (2013.01); *H01G 9/016* (2013.01); *H01G 11/84* (2013.01); *H01G 11/12* (2013.01)

USPC .......................................... 29/25.03

(58) Field of Classification Search
None
See application file for complete search history.

(56) References Cited

U.S. PATENT DOCUMENTS

| | | |
|---|---|---|
| 3,796,598 A | 3/1974 | Gejyo et al. |
| 4,155,781 A | 5/1979 | Diepers |
| 5,338,625 A | 8/1994 | Bates et al. |
| 6,451,113 B1 | 9/2002 | Givargizov |
| 6,685,804 B1 | 2/2004 | Ikeda et al. |

(Continued)

FOREIGN PATENT DOCUMENTS

| | | |
|---|---|---|
| JP | 2001-210315 | 8/2001 |
| JP | 2002-083594 | 3/2002 |

(Continued)

OTHER PUBLICATIONS

Li-Feng Cui et al., "Crystalline-Amorphous Core-Shell Silicon Nanowires for High Capacity and High Current Battery Electrodes," Nano Letters, 2009, vol. 9, No. 1, pp. 491-495.

(Continued)

*Primary Examiner* — Seahvosh Nikmanesh
(74) *Attorney, Agent, or Firm* — Nixon Peabody LLP; Jeffrey L. Costellia (57) ABSTRACT

To provide a method for forming an electrode for a storage battery, including the step of: forming a metal layer which is over a current collector and has an edge portion; and forming a crystalline silicon layer, which is over the etched metal layer and includes a silicon whisker, as an active material layer by a low pressure chemical vapor deposition (LPCVD) method in which heating is performed with the use of a deposition gas containing silicon.

20 Claims, 7 Drawing Sheets

(56) References Cited

U.S. PATENT DOCUMENTS

| | | |
|---|---|---|
| 6,844,113 B2 | 1/2005 | Yagi et al. |
| 6,887,511 B1 | 5/2005 | Shima et al. |
| 7,015,496 B2 | 3/2006 | Ohnuma et al. |
| 7,192,673 B1 | 3/2007 | Ikeda et al. |
| 7,235,330 B1 | 6/2007 | Fujimoto et al. |
| 7,241,533 B1 | 7/2007 | Ikeda et al. |
| 7,396,409 B2 | 7/2008 | Hatta et al. |
| 7,410,728 B1 | 8/2008 | Fujimoto et al. |
| 7,794,881 B1 | 9/2010 | Fujimoto et al. |
| 2002/0168574 A1 | 11/2002 | Ahn et al. |
| 2005/0244324 A1 | 11/2005 | Hatta et al. |
| 2007/0007239 A1 | 1/2007 | Lee et al. |
| 2008/0020281 A1 | 1/2008 | Kogetsu et al. |
| 2008/0261112 A1* | 10/2008 | Nagata et al. ............... 429/218.1 |
| 2009/0117462 A1 | 5/2009 | Okazaki et al. |
| 2009/0136847 A1 | 5/2009 | Jeong et al. |
| 2009/0197209 A1* | 8/2009 | Penner et al. ................. 430/320 |
| 2009/0317726 A1 | 12/2009 | Hirose et al. |
| 2010/0086837 A1 | 4/2010 | Asari et al. |
| 2010/0092856 A1 | 4/2010 | Hirose et al. |
| 2010/0151322 A1 | 6/2010 | Sato et al. |
| 2010/0178564 A1 | 7/2010 | Asari et al. |
| 2010/0209784 A1 | 8/2010 | Yamazaki et al. |
| 2010/0266898 A1 | 10/2010 | Yamamoto et al. |
| 2011/0151290 A1 | 6/2011 | Cui et al. |
| 2011/0266654 A1 | 11/2011 | Kuriki et al. |
| 2011/0305950 A1 | 12/2011 | Kuriki et al. |
| 2012/0003383 A1 | 1/2012 | Furuno |
| 2012/0328962 A1 | 12/2012 | Takeuchi et al. |

FOREIGN PATENT DOCUMENTS

| | | |
|---|---|---|
| JP | 2003-246700 | 9/2003 |
| JP | 2004-224576 | 8/2004 |
| JP | 2004-281317 | 10/2004 |
| JP | 2008-103118 A | 5/2008 |
| JP | 2009-134917 A | 6/2009 |
| JP | 2010-262752 | 11/2010 |

OTHER PUBLICATIONS

T.I. Kamins et al., "Ti-catalyzed Si nanowires by chemical vapor deposition: Microscopy and growth mechanisms," Journal of Applied Physics, Jan. 15, 2001, vol. 89, No. 2, pp. 1008-1016.

Hideo Kohno et al., "Silicon Nanoneedles Grown by a Sample Thermal Treatment Using Metal-Sulfur Catalysts," Jpn. J. Appl. Phys., Feb. 1, 2002, vol. 41, No. 2A, pp. 577-578.

Jung, H. et al., "Amorphous silicon thin-film negative electrode prepared by low pressure chemical vapor deposition for lithium-ion batteries," Solid State Communications, Feb. 1, 2003, vol. 125, No. 7-8, pp. 387-390.

* cited by examiner

POWER STORAGE DEVICE AND METHOD FOR MANUFACTURING THE SAME

BACKGROUND OF THE INVENTION

1. Field of the Invention

The present invention relates to a power storage device and a method for manufacturing the power storage device.

Note that the power storage device indicates all elements and devices which have a function of storing power.

2. Description of the Related Art

In recent years, power storage devices such as lithium-ion secondary batteries, lithium-ion capacitors, and air cells have been developed.

An electrode for the power storage device is manufactured by providing an active material over a surface of a current collector. As the active material, a material which can adsorb and release ions functioning as carriers, such as carbon or silicon, is used. For example, silicon or phosphorus-doped silicon has an advantage of larger theoretical capacity than carbon and larger capacity of a power storage device (e.g., Patent Document 1).

REFERENCE

Patent Document

[Patent Document 1] Japanese Published Patent Application No. 2001-210315

SUMMARY OF THE INVENTION

However, even when silicon is used as a negative electrode active material, it is difficult to obtain as large a discharge capacity as the theoretical capacity. In view of the above, an object of one embodiment of the present invention is to provide a power storage device whose discharge capacity is larger and a method for manufacturing the power storage device.

One embodiment of the present invention is a method for manufacturing a power storage device including the steps of: forming a metal layer over a current collector including first metal, the metal layer including second metal which is different from the first metal; etching the metal layer to form a pattern of the metal layer; and forming an active material layer including a silicon whisker by a low pressure chemical vapor deposition (LPCVD) method in which heating is performed with the use of a deposition gas containing silicon, the active material layer being over the etched metal layer.

Another embodiment of the present invention is a power storage device including: a current collector including a first metal element; a rectangular metal layer being over the current collector and including a second metal element which is different from the first metal element; and an active material layer being over the metal layer and the current collector and including a silicon whisker.

The silicon whisker is a protrusion of crystalline silicon (whisker-like crystalline silicon). In a plurality of silicon whiskers, the growth directions (i.e., the directions of axes) of protrusions may be uneven. Further, the growth directions (i.e., the directions of axes) of the protrusions in the plurality of silicon whiskers may be the normal direction of the current collector.

The surface area of an active material layer is increased when the active material layer comprises a silicon whisker, and thus, a discharge capacity can be increased.

For the current collector, a material with high conductivity can be used, such as a metal element typified by platinum, aluminum, or copper. Further, the current collector may be formed using a metal element which forms silicide.

The metal layer is preferably formed using one or more of metal elements which form silicide, e.g., zirconium, titanium, hafnium, vanadium, niobium, tantalum, chromium, molybdenum, cobalt, tungsten, and nickel.

Further, a mixed region of the metal element and silicon may be formed between the current collector and the active material layer or between the metal layer and the active material layer. When the mixed region of the metal element and silicon is included, a low-density region (coarse region) is not formed between the current collector and the active material layer or between the metal layer and the active material layer. Thus, the interface characteristics between the active material layer and a layer in contact with the active material layer can be improved.

In addition, a metal oxide layer may be provided between the mixed region and the active material layer. The metal oxide layer is formed using a metal oxide of a metal element contained in the current collector or the metal layer. By formation of the metal oxide layer using an oxide semiconductor or an oxide conductor, resistance between the current collector and the active material layer or between the metal layer and the active material layer can be reduced, and the discharge capacity can be even larger than in the case where the metal oxide layer is formed using an insulator.

According to one embodiment of the present invention, a power storage device having a large discharge capacity can be manufactured.

DETAILED DESCRIPTION OF THE INVENTION

Examples of embodiments of the present invention will be described with reference to drawings. Note that the present invention is not limited to the following description, and it will be easily understood by those skilled in the art that various changes and modifications can be made without departing from the spirit and scope of the present invention. Thus, the present invention should not be interpreted as being limited to the following description of the embodiments. In description with reference to drawings, in some cases, the same reference numerals are used in common for the same portions in different drawings. Further, in some cases, the same hatching patterns are applied to similar parts, and the similar parts are not necessarily designated by reference numerals.

Embodiment 1

In this embodiment, an electrode for a power storage device which is one embodiment of the present invention and a method for manufacturing the electrode will be described with reference to FIGS. 1A and 1B and FIGS. 2A and 2B.

Figure 1A:
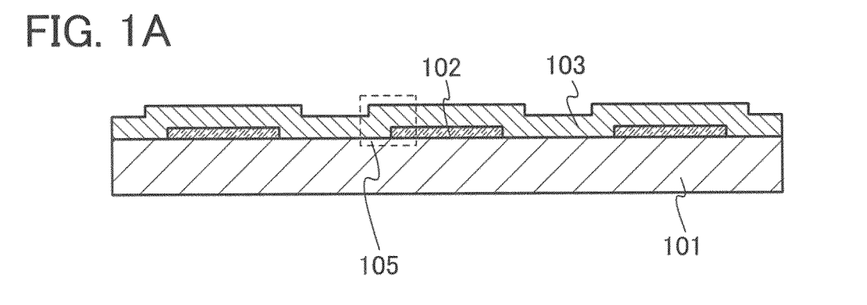
FIGS. 1A and 1B are cross-sectional views illustrating a structure of an electrode of a power storage device.

The electrode of the power storage device illustrated in FIG. 1A is formed as follows. A metal layer is formed over a current collector 101, and the metal layer is selectively etched, whereby a metal layer 102 is formed. Then, as an active material layer 103, a crystalline silicon layer is formed over the metal layer 102 by a thermal CVD method, preferably by an LPCVD method.

The current collector 101 functions as a current collector of the electrode. Thus, a conductive material having a foil shape, a plate shape, or a net shape is used. The current collector 101 may be formed using, without a particular limitation, a metal element with high conductivity typified by platinum, aluminum, copper, or titanium. Note that the current collector is preferably formed using an aluminum alloy to which an element which improves heat resistance, such as silicon, titanium, neodymium, scandium, or molybdenum, is added. Alternatively, a silicon wafer may be used as the current collector 101. Further alternatively, the current collector 101 may be formed using a metal element which forms silicide by reacting with silicon of the active material layer 103. Examples of the metal element which forms silicide include zirconium, titanium, hafnium, vanadium, niobium, tantalum, chromium, molybdenum, tungsten, cobalt, nickel, and the like.

The metal layer 102 is a layer including a metal element which promotes crystal growth of the active material layer. As the metal element used in the metal layer, a metal element which functions as a catalyst promoting crystal growth of the active material layer 103 can be used. For example, a metal element which forms silicide can be preferably formed. Examples of the metal element which forms silicide include zirconium, titanium, hafnium, vanadium, niobium, tantalum, chromium, molybdenum, tungsten, cobalt, nickel, and the like.

As described above, the metal layer 102 has a function of promoting crystal growth of the active material layer. Therefore, after the metal layer is formed over the current collector 101, the metal layer is patterned by etching; thus, a region of crystal nucleation is generated in the active material layer 103 over the current collector 101 can be controlled. The metal layer 102 is preferably formed to a thickness of greater than or equal to 100 nm and less than or equal to 1000 nm. In order to increase the region of crystal nucleation, it is more preferable to provide a plurality of separate metal layers 102.

The metal layer is etched in a state where the current collector 101 and the metal layer are stacked. Therefore, etching rate between the metal element in the current collector 101 and the metal element in the metal layer needs to be different. Accordingly, the current controller 101 and the metal layer 102 include different metal elements. The metal layer 102 may be a stack of thin films including different metal elements. In that case, at least a metal element included in a layer in contact with the current collector 101 is different from the metal element included in the current collector 101.

The active material layer 103 is a crystalline silicon layer. The crystalline silicon layer can be formed by an LPCVD method, for example. For example, heating is performed at higher than 550° C. and lower than or equal to the temperature at which an LPCVD apparatus and the current collector 101 can withstand, preferably higher than or equal to 580° C. and lower than 650° C., and a deposition gas containing silicon is used as a source gas. Thus, the crystalline silicon layer can be formed. Examples of the deposition gas containing silicon include silicon hydride, silicon fluoride, and silicon chloride; typically, $SiH_4$, $Si_2H_6$, $SiF_4$, $SiCl_4$, $Si_2Cl_6$, and the like are given. Note that one or more of a rare gas such as helium, neon, argon, and xenon and hydrogen may be mixed in the source gas.

Note that oxygen and the like due to a chamber of the LPCVD apparatus are included as impurities in the active material layer 103 in some cases.

Note that an impurity element imparting one conductivity type, such as phosphorus or boron, may be added to the crystalline silicon layer as the active material layer 103. A crystalline silicon layer to which the impurity element imparting one conductivity type, such as phosphorus or boron, is added has higher conductivity, so that the electric conductivity of the electrode can be increased. Therefore, with the use of the crystalline silicon layer as the active material layer, the discharge capacity can be further increased.

When the crystalline silicon layer is formed as the active material layer 103 by an LPCVD method, a low-density region is unlikely to be formed between the current collector 101 and the active material layer 103 or between the metal layer 102 and the active material layer 103. In addition, movement of electrons at the interface between the active material layer 103 and a layer in contact with the active material layer 103 is facilitated, and adhesion between the current collector 101 and the active material layer 103 or between the metal layer 102 and the active material layer 103 can be increased. One of the reasons is that active species of the source gas are supplied to the crystalline silicon layer that is being deposited in a step of forming the crystalline silicon layer, so that silicon diffuses into the current collector 101 and the metal layer 102 from the crystalline silicon layer. Even if a region (a sparse region) lacking in silicon is formed, the active species of the source gas are continuously supplied to the region; therefore, a low-density region is unlikely to be formed in the crystalline silicon layer. In addition, since the crystalline silicon layer is formed over the current collector 101 and the metal layer 102 by vapor-phase growth, throughput can be improved.

Figure 1B:
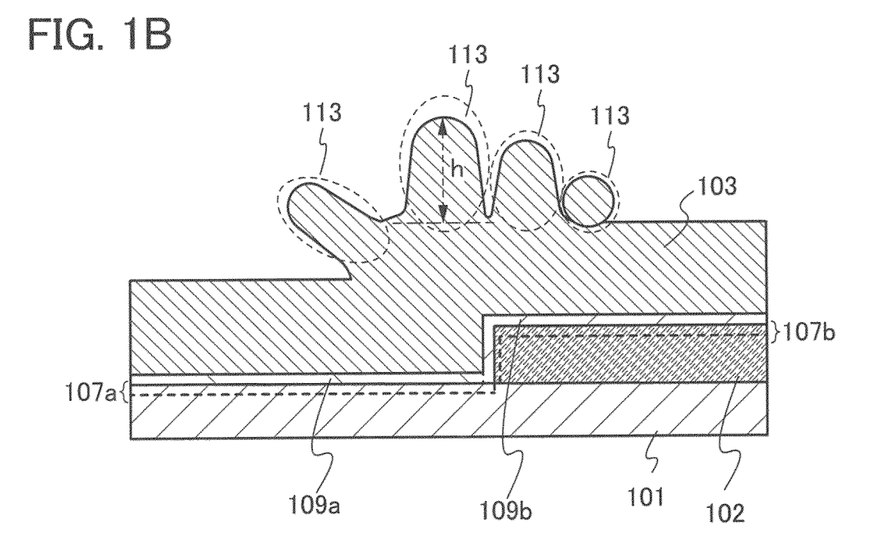

Here, an enlarged view of a region 105 including the current collector 101, the metal layer 102, and the active material layer 103 which is surrounded by a dashed line is illustrated in FIG. 1B.

As illustrated in FIG. 1B, a first mixed region 107a of silicon and the metal element included in the current collector 101 may be formed in the vicinity of a surface of the current collector 101 over which the active material layer 103 is formed. Further, a second mixed region 107b of silicon and the metal element included in the metal layer 102 may be formed in the vicinity of a surface of the metal layer 102 over which the active material layer 103 is formed. By heating performed in the formation of the crystalline silicon layer as the active material layer 103 by an LPCVD method, silicon included in the crystalline silicon layer diffuses into the current collector 101 or the metal layer 102; thus, the first mixed region 107a or the second mixed region 107b of silicon and the metal element is formed. Note that the interface between the first mixed region 107a and the second mixed region 107b is not clear; a mixed region of the metal element included in the current collector 101, the metal element included in the metal layer 102, and silicon is formed in some cases.

The metal layer 102 is formed using a metal element which forms silicide. Thus, silicide including the metal element is formed in the second mixed region 107b; typically, one or more of zirconium silicide, titanium silicide, hafnium silicide, vanadium silicide, niobium silicide, tantalum silicide, chromium silicide, molybdenum silicide, tungsten silicide, cobalt silicide, and nickel silicide, are formed.

In the case where the current collector 101 is formed using a metal element which forms silicide, one or more of the above-described silicide of silicon and the metal element which forms silicide are formed in the first mixed region 107a. Alternatively, an alloy layer of silicon and the metal element which forms silicide is formed.

Note that oxygen and the like due to a chamber of the LPCVD apparatus are included as impurities in the first mixed region 107a and the second mixed region 107b in some cases.

The mixed region of silicon and a metal element which is provided between the current collector 101 and the active material layer 103 or between the metal layer 102 and the active material layer 103 can reduce resistance at the interface between the current collector 101 and the active material layer 103 or between the metal layer 102 and the active material layer 103. Thus, the conductivity of the electrode can be increased. In addition, the adhesion between the current collector 101 and the active material layer 103 or between the metal layer 102 and the active material layer 103 can be increased, so that deterioration of the power storage device can be suppressed.

Over the first mixed region 107a, a first metal oxide layer 109a which is formed using an oxide of the metal element contained in the current collector 101 may be formed. Further, over the second mixed region 107b, a second metal oxide layer 109b which is formed using an oxide of the metal element contained in the metal layer 102 may be formed. These metal oxide layers are sometimes formed in the following manner. Oxygen is desorbed from a quartz chamber of the LPCVD apparatus by the heating performed in the formation of the crystalline silicon layer to be the active material layer 103 by an LPCVD method, and the current collector 101 or the metal layer 102 is oxidized. Note that in the case where the first metal oxide layer 109a and the second metal oxide layer 109b are formed, the interface between the first metal oxide layer 109a and the second metal oxide layer 109b is sometimes not clear; a metal oxide layer including an oxide of a first metal element contained in the current collector 101 and an oxide of a second metal element contained in the metal layer 102 is formed in some cases. When the crystalline silicon layer is formed by an LPCVD method, by filling the chamber with a rare gas such as helium, neon, argon, or xenon, the formation of the metal oxide layer can be suppressed.

A metal oxide layer containing an oxide of a metal element which forms silicide is used as the second metal oxide layer 109b. When the current collector 101 is formed using the metal element which forms silicide, a metal oxide layer containing an oxide of the metal element which forms silicide is formed as the first metal oxide layer 109a. Typical examples of such a metal oxide layer are zirconium oxide, titanium oxide, hafnium oxide, vanadium oxide, niobium oxide, tantalum oxide, chromium oxide, molybdenum oxide, tungsten oxide, cobalt oxide, nickel oxide, and the like.

When the current collector 101 or the metal layer 102 is formed using titanium, zirconium, niobium, or the like, an oxide conductor such as titanium oxide, zirconium oxide, or niobium oxide is formed as the first metal oxide layer 109a or the second metal oxide layer 109b. Thus, resistance between the current collector 101 and the active material layer 103 or between the metal layer 102 and the active material layer 103 can be reduced, whereby the conductivity of the electrode can be increased. Therefore, the discharge capacity can be further increased.

The active material layer 103 is provided to cover the current collector 101 and the metal layer 102 and includes a silicon whisker 113. The silicon whisker 113 is a protrusion of crystalline silicon (whisker-like crystalline silicon). In a plurality of silicon whiskers 113, the directions of the tops of the protrusions are dispersed. Note that the shape of the silicon whisker 113 is not limited to a whisker-like shape and may be a columnar shape such as a cylinder shape or a prism shape, or a needle-like shape such as a cone shape or a pyramid shape. The top of the silicon whisker 113 may be curved. The diameter of the silicon whisker 113 is greater than or equal to 50 nm and less than or equal to 10 preferably greater than or equal to 500 nm and less than or equal to 3 μm. The length h of the silicon whisker 113 is greater than or equal to 0.5 μm and less than or equal to 1000 μm, preferably greater than or equal to 1 μm and less than or equal to 100 μm.

The length h of the silicon whisker 113 means the size of the silicon whisker 113 in the growth direction (longitudinal direction). For example, when the silicon whisker 113 has a columnar shape, the length h means a distance between the bottom surface and the top surface; when the silicon whisker 113 has a needle-like shape, the length h means a distance between the vertex and the bottom surface. In the plurality of silicon whiskers 113, lengths h are not necessarily equal.

Note that the growth direction of the silicon whisker 113 may be referred to as a longitudinal direction; a shape of a section of the silicon whisker 113 running in the longitudinal direction may be referred to as a longitudinal cross-sectional shape. In addition, a shape of a section of the silicon whisker 113, in which the longitudinal direction is a normal direction, may be referred to as a transverse cross-sectional shape.

FIG. 1B illustrates the case where the longitudinal directions of the silicon whiskers 113 are uneven. For example, the longitudinal directions are the normal direction to the surface of the current collector 101 and a second direction which is different from the normal direction. Thus, FIG. 1B illustrates both the longitudinal cross-sectional shapes of the silicon whiskers 113 and the transverse cross-sectional shape of the silicon whisker 113. In FIG. 1B, the transverse cross-sectional shape is circular because it is the shape of section of a protrusion having a cylinder or cone shape running in the lateral direction. However, when the protrusion has a prism or pyramid shape, the transverse cross-sectional shape is polygonal. When the longitudinal directions of the silicon whiskers 113 are uneven, the protrusions are tangled with each other in some cases; therefore, the protrusions are unlikely to be separated at the time of charge and discharge of the power storage device.

Note that the growth directions of the silicon whiskers 113 are not limited to those shown in FIG. 1B. The longitudinal directions of the silicon whiskers 113 may be one direction, e.g., the normal direction to the surface of the current collector 101. Note that in the case where the longitudinal directions of the silicon whiskers 113 are one direction, the longitudinal directions of the silicon whiskers 113 may be substantially the same as the normal direction to the surface of the current collector 101, and it is preferable that the difference between the two directions be typically within 5°.

The silicon whiskers 113 grow with the use of the metal element contained in the metal layer 102 as a catalyst. Thus, as shown in FIG. 1B, the silicon whiskers 113 are densely formed in a region overlapping with the metal layer 102, particularly in a region overlapping with the edge portion of the metal layer 102. As described above, by selectively providing the metal layer 102, a region where the silicon whisker 113 is generated (the region can also be referred to as a region of nucleation of crystalline silicon) over the current collector 101 can be effectively controlled. Since the silicon whiskers 113 are densely formed in the region overlapping with the edge portion of the metal layer 102, the metal layer 102 is preferably formed in a shape having an edge portion, e.g., in a rectangular shape. Although the size of the metal layer 102 and the distance between one metal layer 102 and another metal layer 102 can be determined as appropriate, the metal layers 102 which are formed in minute shapes are preferable because the region of nucleation can be increased.

Figure 2A:
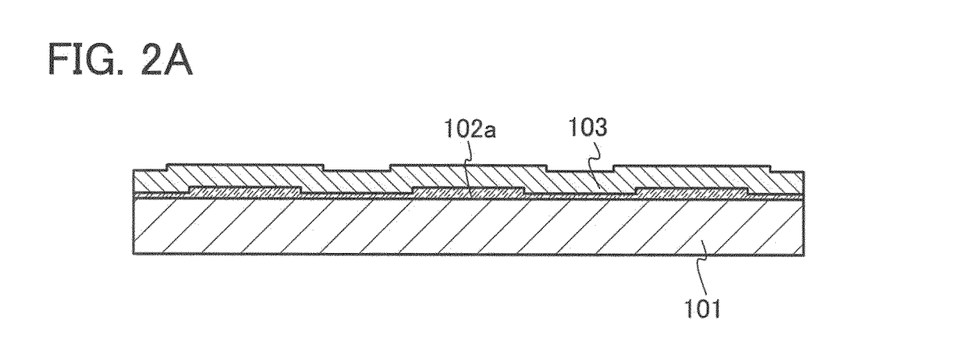
FIGS. 2A and 2B are cross-sectional views illustrating structures of electrodes of power storage devices.

The metal layer 102 preferably has an edge portion, and its shape is not limited to that shown in FIGS. 1A and 1B. For example, as shown in FIG. 2A, after a metal layer is formed over the current collector 101, the metal layer may be subjected to half-etching, so that a metal layer 102a having a depression and a projection may be formed. Alternatively, after a metal layer is formed over the current collector 101, the metal layer may be subjected to sandblasting or the like, so that a depression and a projection may be formed on a surface of the metal layer. Alternatively, the metal layer may be formed with the use of these methods in combination.

The electrode of the power storage device described in this embodiment includes at least the metal layer between the current collector and the crystalline silicon layer functioning as the active material layer. Therefore, a silicon whisker can be effectively generated in the active material layer, and a region where the silicon whisker is generated can be controlled. Thus, the discharge capacity of the electrode can be increased. Further, it is preferable that a mixed region be provided between the current collector and the crystalline silicon layer functioning as the active material layer or between the metal layer and the crystalline silicon layer functioning as the active material layer. The mixed region can reduce interface resistance between the current collector and the crystalline silicon layer or between the metal layer and the crystalline silicon layer and increase adhesion. Therefore, the degradation of the power storage device can be suppressed.

Figure 2B:
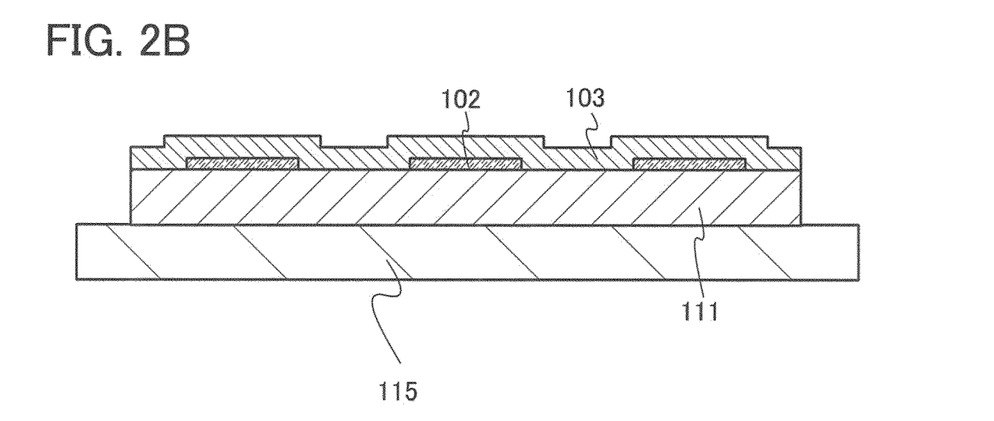

Note that FIGS. 1A and 1B illustrate the case where the current collector 101 is formed using a conductive material having a foil shape, a plate shape, or a net shape; however, as illustrated in FIG. 2B, a current collector 111 can be formed by a sputtering method, an evaporation method, a printing method, an inkjet method, a CVD method, or the like as appropriate over a substrate 115.

Experimental Example 1

The effect of a crystalline silicon layer including a silicon whisker, which is used for part of an electrode of a power storage device, was examined. Specifically, a power storage device in which a crystalline silicon layer including a silicon whisker was used as an active material layer of a cathode (experimental example 1) and a power storage device in which a crystalline silicon layer which was flat was used as an active material layer of a cathode (comparative example) were prepared, and the characteristics of these devices were compared.

Note that the structure of the power storage device according to the experimental example 1 was the same as that of the power storage device according to the comparative example, except for the active material layer of the cathode. That is, the results of the present experimental example are due to difference in the active material layer of the cathode.

A large number of silicon whiskers were included in the active material layer of the cathode of the power storage device according to the experimental example 1; thus, the surface area of the active material layer was large as compared to the case of using the active material layer which was flat. The largest length of a silicon whisker was about 15 μm to 20 μm. The diameter of a silicon whisker near the root was about 1 μm to 2 μm. The growth directions of the silicon whiskers were uneven.

A crystalline silicon layer which was flat was used for the active material layer of the cathode of the power storage device in accordance with the comparative example. The crystalline silicon layer was obtained by performing heat treatment on an amorphous silicon layer to which phosphorus was added and which was formed by a plasma CVD method. The heat treatment was performed under an Ar atmosphere at 700° C. for six hours.

As for the two types of power storage devices having different types of active material layers of cathodes described above, discharge capacities were measured with a charge-discharge measuring instrument. For the measurements, a constant current mode was used, and charge and discharge were performed with a current of 2.0 mA at a rate of approximately 0.2 C. The upper limit voltage was 1.0 V, and the lower limit voltage was 0.03 V. All the measurements were performed at room temperature (approximately 25° C.).

Initial characteristics of the power storage devices (initial characteristics of a discharge capacity per unit volume (mAh/cm$^3$) of the active material layers) measured in this manner were as follows: 7300 mAh/cm$^3$ in the power storage device according to the experimental example 1 and 4050 mAh/cm$^3$ in the power storage device according to the comparative example. It is shown that the initial characteristics of the power storage device according to the experimental example 1 is about 1.8 times as large as that of the power storage device according to the comparative example. Here, the thickness of the active layer in the power storage device according to the experimental example 1 was 3.5 μm and the thickness of the active material layer in the power storage device according to the comparative example was 3.0 μm, and the discharge capacity (mAh/cm$^3$) was calculated.

From the above, the actual capacity of the power storage device according to the present experimental example is close to the theoretical capacity (9800 mAh/cm$^3$) of the power storage device. Thus, it can be understood that the use of the crystalline silicon layer including a silicon whisker for part of an electrode of a power storage device is quite effective.

Experimental Example 2

In the present experimental example, the growth of silicon whiskers in the case where a silicon layer is deposited by an LPCVD method over a plurality of separate metal layers having a rectangular shape is described.

In the present experimental example, a titanium layer with a thickness of 1 μm was formed as a metal layer over a glass substrate by a sputtering method, and then, the titanium layer was etched, so that a plurality of titanium layers having a rectangular shape were formed. Then, a crystalline silicon layer was deposited over the titanium layer by an LPCVD method. The deposition of the crystalline silicon layer by an LPCVD method was performed as follows: silane was introduced as a source gas into a reaction chamber with a flow rate of 300 sccm, the pressure of the reaction chamber was 20 Pa, and the temperature of the reaction chamber was 600° C. The deposition time was 2 hours 15 minutes.

Figure 7A:
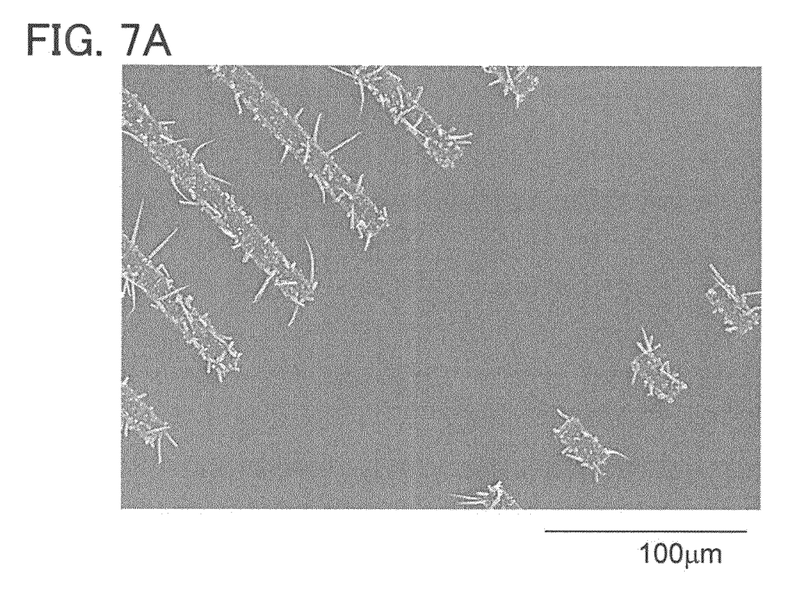
FIGS. 7A and 7B are SEM images of a crystalline silicon layer.
Figure 7B:
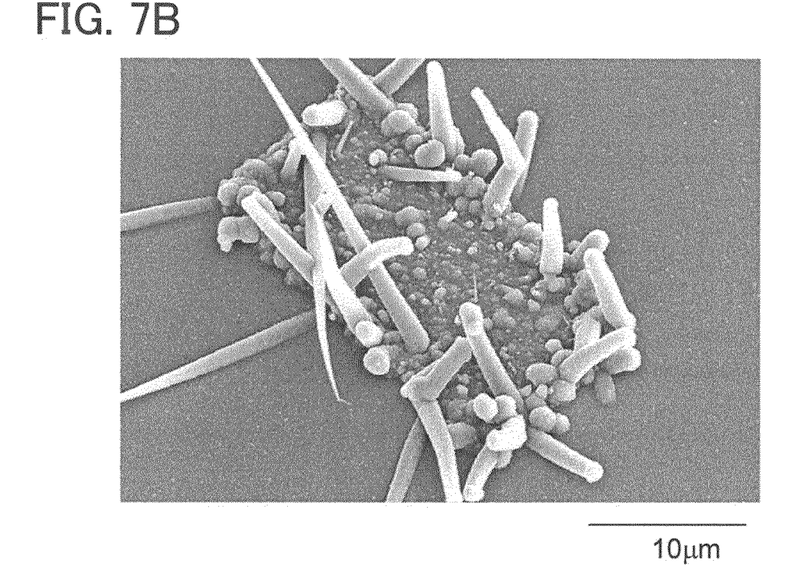

FIGS. 7A and 7B are SEM (scanning electron microscope) images of the deposited crystalline silicon layer. Note that FIG. 7A is the SEM image at 400-fold magnification, and FIG. 7B is the SEM image at 3000-fold magnification.

As shown in FIGS. 7A and 7B, in the crystalline silicon layer, silicon whiskers selectively grown on the titanium layer provided as the metal layer. The growth directions of the silicon whiskers were uneven, and the largest length of a silicon whisker was about 15 μm to 20 μm. The diameter of a silicon whisker near the root was about 1 μm to 2 μm.

Further, it was confirmed that the silicon whiskers did not evenly generate on the titanium layer but were formed more densely on the edge portion of the titanium layer than on the flat portion of the titanium layer.

As described above, with the metal layer (titanium layer in the present experimental example), a silicon whisker can be effectively generated in the crystalline silicon layer. Further, it is shown that a region where a silicon whisker is generated can be controlled by the arrangement and the shape of the metal layer.

The metal layer and the crystalline silicon layer are formed over a glass substrate in the present experimental example. However, as a matter of course, the generation of the silicon whisker can be controlled even in the case where they are formed over a current collector.

Thus, according to this embodiment, an electrode of a power storage device with a large discharge capacity is realized. This embodiment can be combined with any other embodiment.

Embodiment 2

In this embodiment, a structure of a power storage device will be described with reference to FIGS. 3A and 3B.

First, a structure of a secondary battery which is an example of a power storage device is described. Among secondary batteries, a lithium ion battery formed using a metal oxide containing lithium, such as $LiCoO_2$, has a large discharge capacity and high safety. Therefore, a structure of a lithium ion battery that is a typical example of a secondary battery is described.

Figure 3A:
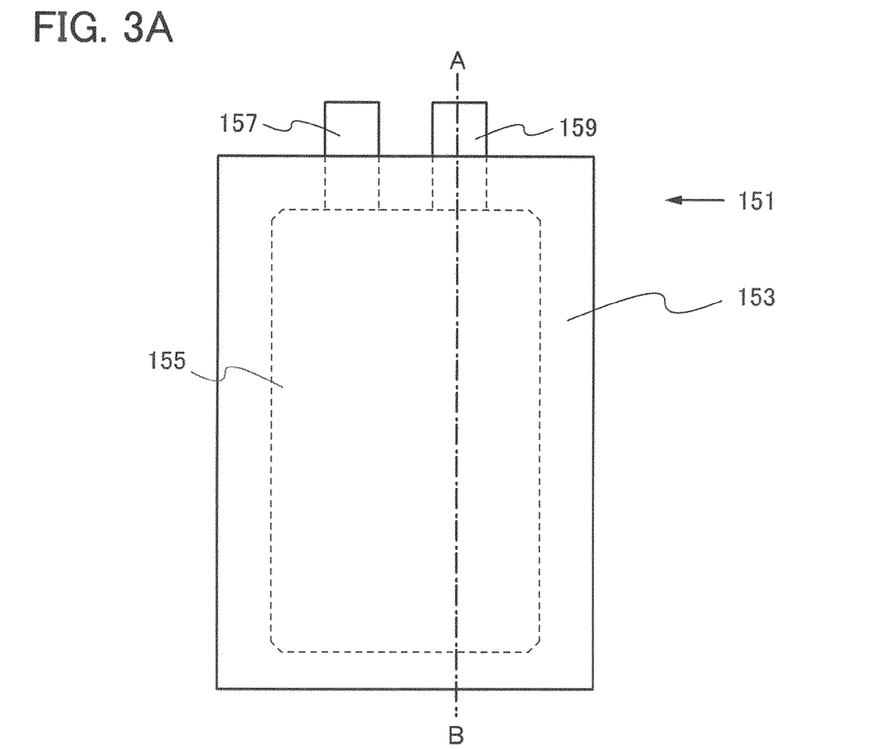
FIGS. 3A and 3B are a plan view and a cross-sectional view illustrating one embodiment of a power storage device.
Figure 3B:
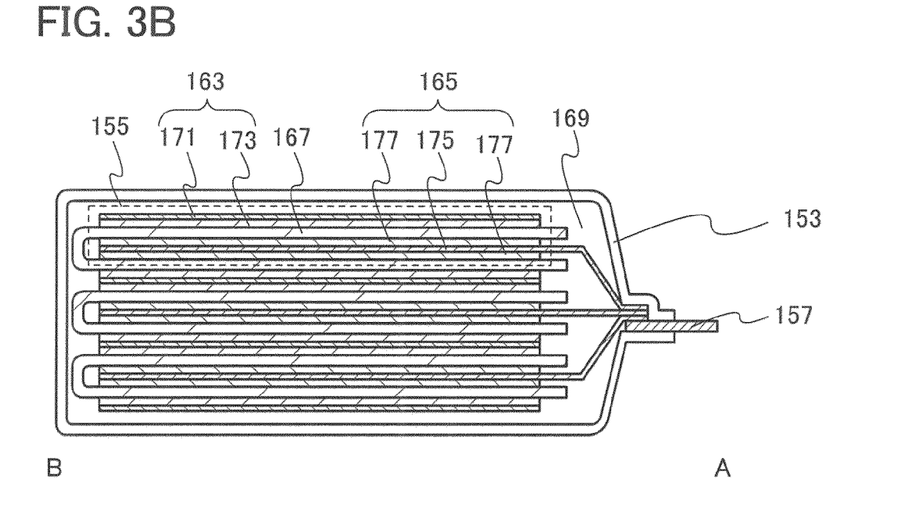

FIG. 3A is a plan view of a power storage device 151, and FIG. 3B is a cross-sectional view taken along dot-dashed line A-B in FIG. 3A.

The power storage device 151 illustrated in FIG. 3A includes a power storage cell 155 in an exterior member 153. The power storage device 151 further includes terminal portions 157 and 159 which are connected to the power storage cell 155. For the exterior member 153, a laminate film, a polymer film, a metal film, a metal case, a plastic case, or the like can be used.

As illustrated in FIG. 3B, the power storage cell 155 includes a negative electrode 163, a positive electrode 165, a separator 167 between the negative electrode 163 and the positive electrode 165, and an electrolyte 169 with which the exterior member 153 is filled.

The negative electrode 163 includes a negative electrode collector 171 and a negative electrode active material layer 173. The positive electrode 165 includes a positive electrode current collector 175 and a positive electrode active material layer 177. The negative electrode active material layer 173 is formed on one or both of the surfaces of the negative electrode current collector 171. The positive electrode active material layer 177 is formed on one or both of the surfaces of the positive electrode current collector 175.

The negative electrode current collector 171 is connected to the terminal portion 159. The positive electrode current collector 175 is connected to the terminal portion 157. Further, the terminal portions 157 and 159 each partly extend outside the exterior material 153.

Note that although a sealed thin power storage device is described as the power storage device 151 in this embodiment, a power storage device can have a variety of structures; for example, a button power storage device, a cylindrical power storage device, or a rectangular power storage device can be used. Further, although the structure where the positive electrode, the negative electrode, and the separator are stacked is described in this embodiment, a structure where the positive electrode, the negative electrode, and the separator are rolled may be employed.

The negative electrode current collector 171 can be formed using the current collector 101 or 111 described in Embodiment 1.

The negative electrode active material layer 173 can be formed using the active material layer 103, which is formed using the crystalline silicon layer described in Embodiment 1. Note that the crystalline silicon layer may be pre-doped with lithium. In addition, by forming the active material layer 103, which is formed using the crystalline silicon layer, with the negative electrode current collector 171 held by a frame-like susceptor in an LPCVD apparatus, the active material layer 103 can be formed on both of the surfaces of the negative electrode current collector 171 at the same time; therefore, the number of steps can be reduced.

Aluminum, stainless steel, or the like is used for the positive electrode current collector 175. The electrode current collector 175 can have a foil shape, a plate shape, a net shape, or the like as appropriate.

The positive electrode active material layer 177 can be formed using $LiFeO_2$, $LiCoO_2$, $LiNiO_2$, $LiMn_2O_4$, $LiFePO_4$, $LiCoPO_4$, $LiNiPO_4$, $LiMn_2PO_4$, or other lithium compounds; $V_2O_5$; $Cr_2O_5$; or $MnO_2$. Note that when carrier ions are alkali metal ions other than lithium or alkaline earth metal ions, the positive electrode active material layer 177 can be formed using, instead of lithium in the above lithium compounds, an alkali metal (e.g., sodium or potassium), an alkaline earth metal (e.g., calcium, strontium, or barium), beryllium, or magnesium.

As a solute of the electrolyte 169, a material in which lithium ions, i.e., carrier ions, can transfer and stably exist is used. Typical examples of the solute of the electrolyte include lithium salt such as $LiClO_4$, $LiAsF_6$, $LiBF_4$, $LiPF_6$, and $Li(C_2F_5SO_2)_2N$. Note that when carrier ions are alkali metal ions other than lithium or alkaline earth metal ions, the solute of the electrolyte 169 can be formed using alkali metal salt such as sodium salt or potassium salt; alkaline earth metal salt such as calcium salt, strontium salt, or barium salt; beryllium salt; magnesium salt; or the like, as appropriate.

As a solvent of the electrolyte 169, a material in which lithium ions, i.e., carrier ions, can transfer is used. As the solvent of the electrolyte 169, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled polymer is used as the solvent of the electrolyte 169, safety against liquid leakage or the like is increased. In addition, the power storage device 151 can be thin and lightweight. Typical examples of gelled polymers include a silicon gel, an acrylic gel, an acrylonitrile gel, polyethylene oxide, polypropylene oxide, a fluorine-based polymer, and the like.

As the electrolyte 169, a solid electrolyte such as $Li_3PO_4$ can be used.

As the separator 167, an insulating porous material can be used. Typical examples of the separator 167 include cellulose (paper), polyethylene, and polypropylene.

A lithium ion battery has a small memory effect, a high energy density, and a large discharge capacity. In addition, the driving voltage of a lithium ion battery is high. Further, the lithium ion battery does not easily degrade due to repetitive charge and discharge and can be used for a long time, so that cost can be reduced.

Next, a structure of a capacitor which is another example of a power storage device is described. Typical examples of capacitors include a double-layer capacitor, a lithium ion capacitor, and the like.

In the case of a capacitor, instead of the positive electrode active material layer 177 in the secondary battery in FIG. 3A, a material capable of reversibly storing lithium ions and/or anions is preferably used. Typically, the positive electrode active material layer 177 can be formed using active carbon, a conductive polymer, or a polyacene organic semiconductor (PAS).

The lithium ion capacitor has high efficiency of charge and discharge, capability of rapidly performing charge and discharge, and a long life even when it is repeatedly used.

Also in the capacitor, the current collector and the active material layer described in Embodiment 1 is used in a negative electrode, whereby a power storage device having a large discharge capacity can be manufactured.

Note that a power storage device including an electrode which is one embodiment of the disclosed invention is not limited to the above-described device. For example, as a negative electrode of an air cell which is another embodiment of the power storage device, the electrode including the current collector and the active material layer in Embodiment 1 can be used. In that case also, a power storage device with a large discharge capacity can be manufactured.

This embodiment can be combined with any other embodiment.

Embodiment 3

In this embodiment, an application example of the power storage device described in Embodiment 2 is described with reference to FIG. 4.

The power storage device described in Embodiment 2 can be used in electronic devices, e.g., cameras such as digital cameras or video cameras, digital photo frames, mobile phones (also referred to as cellular phones or cellular phone devices), portable game machines, portable information terminals, or audio reproducing devices. Further, the power storage device can be used in electric propulsion vehicles such as electric vehicles, hybrid vehicles, train vehicles, maintenance vehicles, carts, or wheelchairs. Here, as a typical example of the electric propulsion vehicles, a wheelchair is described.

Figure 4:
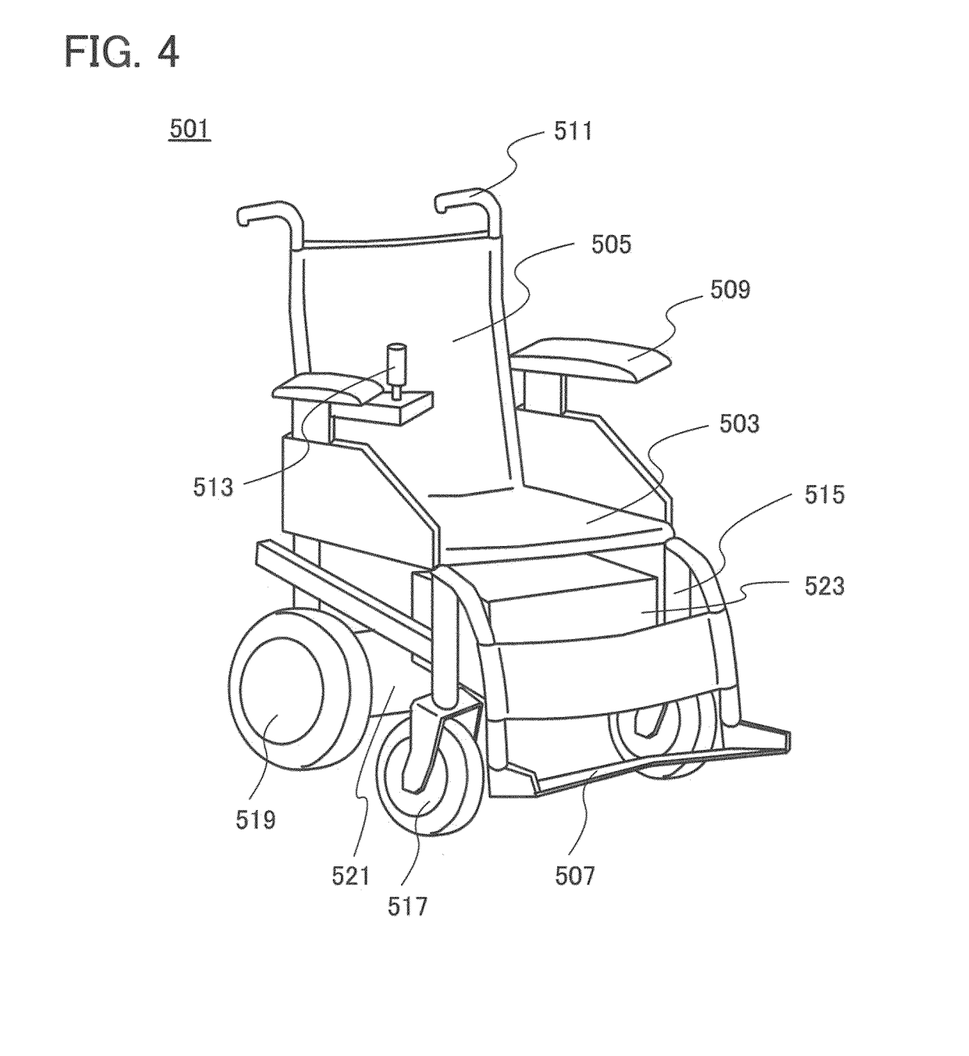
FIG. 4 is a perspective view illustrating an application example of a power storage device.

FIG. 4 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driving portion 521 having a motor, a brake, a gear, and the like. A control portion 523 including a battery, a power controller, a control means, and the like is provided under the seat 503. The control portion 523 is connected to the controller 513 and the driving portion 521. The driving portion 521 drives through the control portion 523 with the operation of the controller 513 by the user and the control portion 521 controls the operation of moving forward, moving back, turning around, and the like, and the speed.

The power storage device described in Embodiment 2 can be used as a power source of the control portion 523. The power source of the control portion 523 can be externally charged by electric power supply using plug-in systems or contactless power feeding. Note that in the case where the electric propulsion vehicle is a train vehicle, the train vehicle can be charged by electric power supply from an overhead cable or a conductor rail.

This embodiment can be combined with any other embodiment.

Embodiment 4

In this embodiment, an example in which the secondary battery according to one embodiment of the present invention is used in a wireless power feeding system (hereinafter referred to as an RF power feeding system) will be described with reference to block diagrams in FIG. 5 and FIG. 6. In each of the block diagrams, independent blocks show elements within a power receiving device and a power feeding device, which are classified according to their functions. However, it may be practically difficult to completely separate the elements according to their functions; in some cases, one element can involve a plurality of functions.

First, the RF power feeding system is described with reference to FIG. 5.

A power receiving device 600 is an electronic device or an electric propulsion vehicle which is driven by electric power supplied from a power feeding device 700, and can be applied to another device which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicles include electric vehicles, hybrid vehicles, train vehicles, maintenance vehicles, carts, wheelchairs, and the like. In addition, the power feeding device 700 has a function of supplying electric power to the power receiving device 600.

Figure 5:
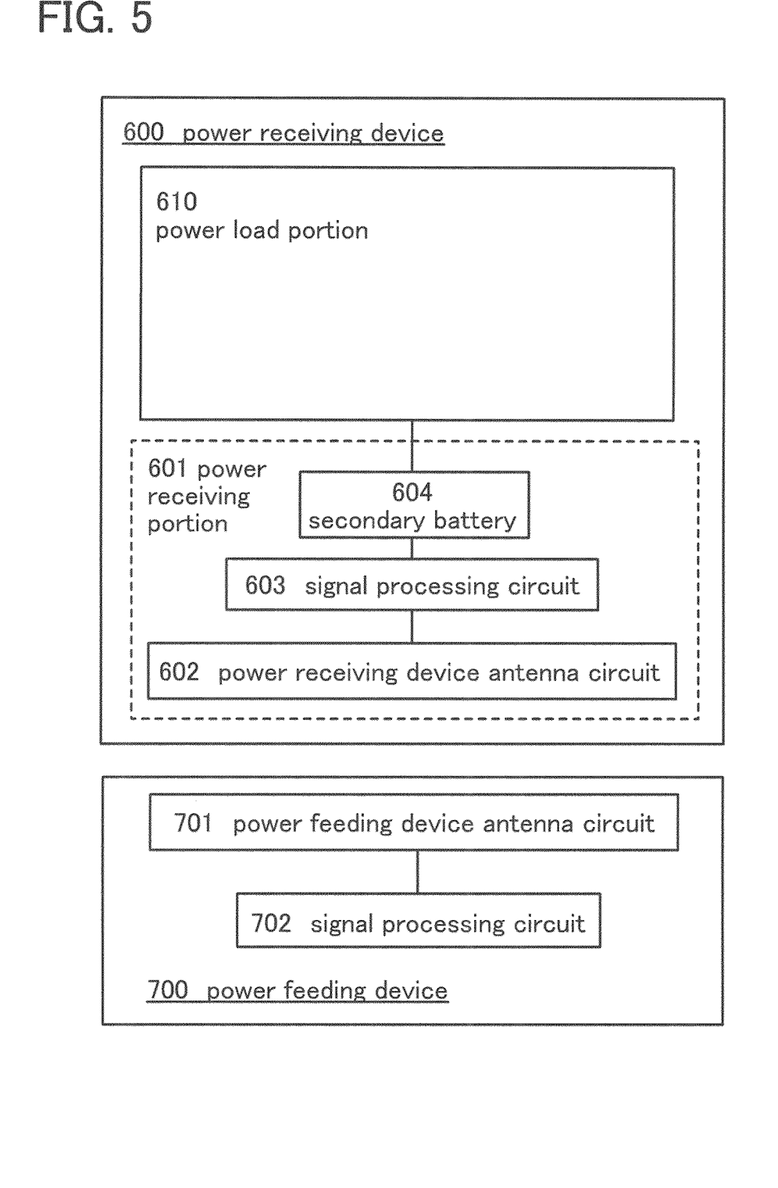
FIG. 5 is a diagram showing a configuration of a wireless power feeding system.

In FIG. 5, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 or transmitting a signal to the power feeding device antenna circuit 701. The signal processing circuit 603 processes a signal received by the power receiving device antenna circuit 602 and controls charging of the secondary battery 604 and supplying of electric power from the secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a driving portion which receives electric power from the secondary battery 604 and drives the power receiving device 600. Typical examples of the power load portion 610 include a motor, a driving circuit, and the like. Another device which drives the power receiving device by receiving electric power can be used as the power load portion 610 as appropriate. The power feeding device antenna circuit 701 has a function of transmitting a signal to the power receiving device antenna circuit 602 or receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The secondary battery according to one embodiment of the present invention is used as the secondary battery 604 included in the power receiving device 600 in the RF power feeding system illustrated in FIG. 5.

With the use of the secondary battery according to one embodiment of the present invention in the RF power feeding system, the amount of power storage can be larger than that in a conventional secondary battery. Therefore, the time interval of the wireless power feeding can be longer (frequent power feeding can be omitted).

In addition, with the use of the secondary battery according to one embodiment of the present invention in the RF power feeding system, the power receiving device 600 can be formed to be compact and lightweight if the amount of power storage with which the power load portion 610 can be driven is the same as that in a conventional power storage device. Therefore, the total cost can be reduced.

Next, another example of the RF power feeding system is described with reference to FIG. 6.

Figure 6:
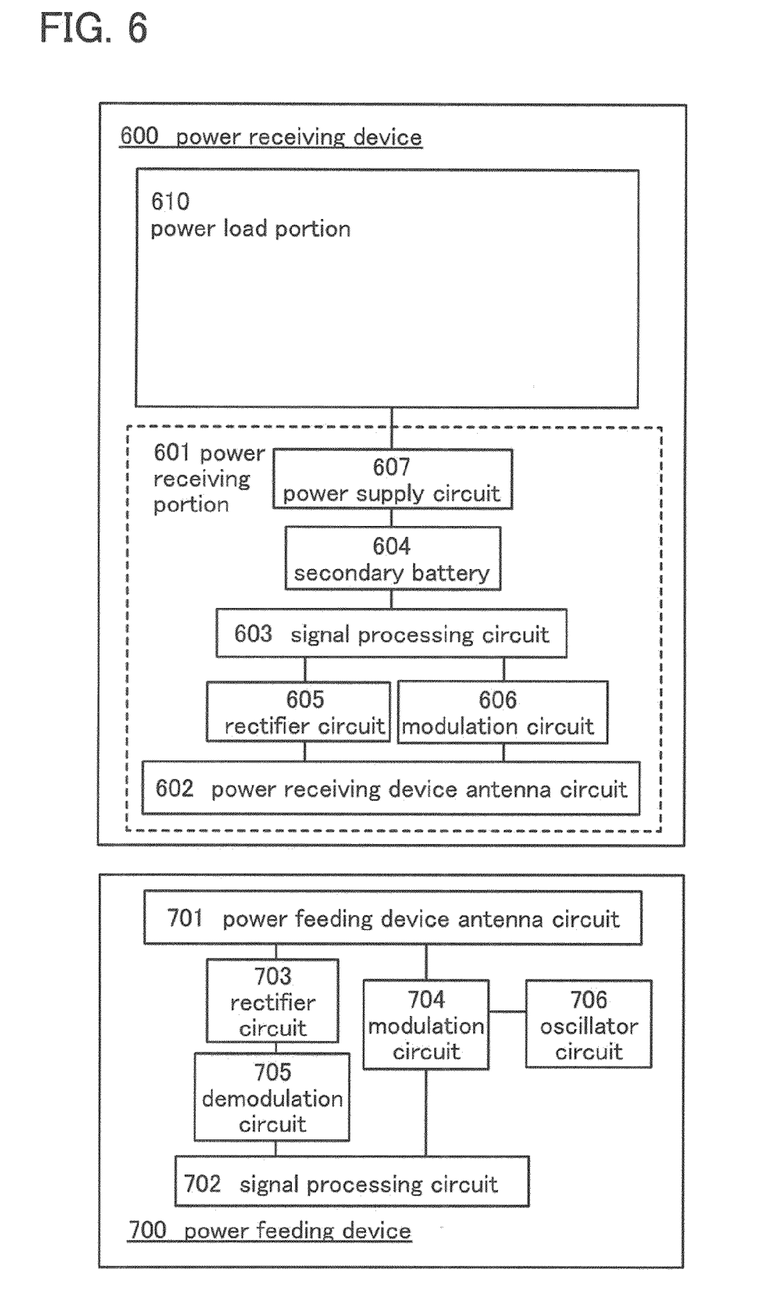
FIG. 6 is a diagram showing a configuration of a wireless power feeding system.

In FIG. 6, the power receiving device 600 includes a power receiving device portion 601 and a power load portion 610. The power receiving device portion 601 includes at least the power receiving device antenna circuit 602, the signal processing circuit 603, the secondary battery 604, a rectifier circuit 605, a modulation circuit 606, and a power supply circuit 607. In addition, the power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 or transmitting a signal to the power feeding device antenna circuit 701. When the power receiving device antenna circuit 602 receives a signal transmitted by the power feeding device antenna circuit 701, the rectifier circuit 605 has a function of generating DC voltage from the signal received by the power receiving device antenna circuit 602. The signal processing circuit 603 has a function of processing a signal received by the power receiving device antenna circuit 602 and controlling charging of the secondary battery 604 and supplying of electric power from the secondary battery 604 to the power supply circuit 607. The power supply circuit 607 has a function of converting voltage stored by the secondary battery 604 into voltage needed for the power load portion 610. The modulation circuit 606 is used when a certain response signal is transmitted from the power receiving device 600 to the power feeding device 700.

With the power supply circuit 607, electric power supplied to the power load portion 610 can be controlled. Thus, overvoltage application to the power load portion 610 can be suppressed, and deterioration or breakdown of the power receiving device 600 can be reduced.

In addition, with the modulation circuit 606, a signal can be transmitted from the power receiving device 600 to the power feeding device 700. Therefore, when the amount of charged power in the power receiving device 600 is judged and a certain amount of power is charged, a signal is transmitted from the power receiving device 600 to the power feeding device 700 so that power feeding from the power feeding device 700 to the power receiving device 600 can be stopped. As a result, the secondary battery 604 is not fully charged, so that the number of charge times of the secondary battery 604 can be increased.

The power feeding device antenna circuit 701 has a function of transmitting a signal to the power receiving device antenna circuit 602 or receiving a signal from the power receiving device antenna circuit 602. When a signal is transmitted to the power receiving device antenna circuit 602, the signal processing circuit 702 generates a signal which is transmitted to the power receiving device 600. The oscillator circuit 706 generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when reception of a signal from the power receiving device antenna circuit 602 is performed, the rectifier circuit 703 has a function of rectifying the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any circuit may be provided between circuits as long as the RF power feeding can be performed. For example, after the power receiving device 600 receives a signal and the rectifier circuit 605 generates DC voltage, a circuit such as a DC-DC converter or regulator that is provided in a subsequent stage may generate constant voltage. Thus, overvoltage application to the inside of the power receiving device 600 can be suppressed.

The secondary battery according to one embodiment of the present invention is used as the secondary battery 604 included in the power receiving device 600 in the RF power feeding system illustrated in FIG. 6.

With the use of the secondary battery according to one embodiment of the present invention in the RF power feeding system, the amount of power storage can be larger than that in a conventional secondary battery. Therefore, the time interval of the wireless power feeding can be longer (frequent power feeding can be omitted).

In addition, with the use of the secondary battery according to one embodiment of the present invention in the RF power feeding system, the power receiving device 600 can be formed to be compact and lightweight if the amount of power storage with which the power load portion 610 can be driven is the same as that in a conventional power storage device. Therefore, the total cost can be reduced.

Note that when the secondary battery according to one embodiment of the present invention is used in the RF power feeding system and the power receiving device antenna circuit 602 and the secondary battery 604 are overlapped with each other, it is preferable that the impedance of the power receiving device antenna circuit 602 is not changed by deformation of the secondary battery 604 due to charge and discharge of the secondary battery 604 and deformation of an antenna due to the above deformation. When the impedance of the antenna is changed, in some cases, electric power is not supplied sufficiently. For example, the secondary battery 604 may be placed in a battery pack formed using metal or ceramics. Note that in that case, the power receiving device antenna circuit 602 and the battery pack are preferably separated from each other by several tens of micrometers or more.

The charging signal has no limitation on its frequency and may have any band of frequency as long as electric power can be transmitted. For example, the charging signal may have any of an LF band of 135 kHz (long wave), an HF band of 13.56 MHz, a UHF band of 900 MHz to 1 GHz, and a microwave band of 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, very-low frequencies of 3 kHz to 30 kHz, low frequencies of 30 kHz to 300 kHz, medium frequencies of 300 kHz to 3 MHz, or high frequencies of 3 MHz to 30 MHz is preferably used.

This embodiment can be combined with any other embodiment.

This application is based on Japanese Patent Application serial no. 2010-122770 filed with Japan Patent Office on May 28, 2010, the entire contents of which are hereby incorporated by reference.

What is claimed is:

1. A method for manufacturing a power storage device, comprising the steps of:
   forming a metal layer over a current collector, wherein the current collector includes a first metal element;
   etching the metal layer to form a patterned metal layer over a first portion of the current collector so that a second portion of the current collector is exposed; and
   forming an active material layer over the current collector, wherein the active material layer includes a silicon layer over the first portion and the second portion, and includes a plurality of silicon whiskers over the first portion,
   wherein the plurality of silicon whiskers formed over the first portion is provided more densely than those formed over the second portion,
   wherein the plurality of silicon whiskers are positioned over the silicon layer, and
   wherein the metal layer includes a second metal element different from the first metal element.

2. The method for manufacturing a power storage device according to claim 1, wherein the plurality of silicon whiskers formed on an edge portion of the patterned metal layer is provided more densely than those formed on a flat portion thereof.

3. The method for manufacturing a power storage device according to claim 1, wherein the second metal element is an element which constitutes a silicide.

4. The method for manufacturing a power storage device according to claim 1, wherein the second metal element is a metal element selected from the group consisting of zirconium, titanium, hafnium, vanadium, niobium, tantalum, chromium, molybdenum, tungsten, cobalt, and nickel.

5. The method for manufacturing a power storage device according to claim 1, wherein the active material layer is formed by a low pressure chemical vapor deposition method with use of a deposition gas containing silicon.

6. The method for manufacturing a power storage device according to claim 1,
   wherein a mixed layer is formed between the patterned metal layer and the silicon layer after forming the active material layer, and
   wherein the mixed layer comprises the second metal element and silicon.

7. The method for manufacturing a power storage device according to claim 1, wherein the plurality of silicon whiskers is formed over the first portion only.

8. A method for manufacturing a power storage device, comprising the steps of:
   forming a metal layer over a current collector, wherein the current collector includes a first metal element;
   etching the metal layer to form a patterned metal layer having a rectangular shape over a first portion of the current collector so that a second portion of the current collector is exposed; and
   forming an active material layer over the current collector, wherein the active material layer includes a silicon layer over the first portion and the second portion, and includes a plurality of silicon whiskers over the first portion,
   wherein the plurality of silicon whiskers formed over the first portion is provided more densely than those formed over the second portion,
   wherein the plurality of silicon whiskers are positioned over the silicon layer, and
   wherein the metal layer includes a second metal element different from the first metal element.

9. The method for manufacturing a power storage device according to claim 8, wherein the plurality of silicon whiskers formed on an edge portion of the patterned metal layer is provided more densely than those formed on a flat portion thereof.

10. The method for manufacturing a power storage device according to claim 8, wherein the second metal element is an element which constitutes a silicide.

11. The method for manufacturing a power storage device according to claim 8, wherein the second metal element is a metal element selected from the group consisting of zirconium, titanium, hafnium, vanadium, niobium, tantalum, chromium, molybdenum, tungsten, cobalt, and nickel.

12. The method for manufacturing a power storage device according to claim 8, wherein the active material layer is formed by a low pressure chemical vapor deposition method with use of a deposition gas containing silicon.

13. The method for manufacturing a power storage device according to claim 8,
   wherein a mixed layer is formed between the patterned metal layer and the silicon layer after forming the active material layer, and
   wherein the mixed layer comprises the second metal element and silicon.

14. The method for manufacturing a power storage device according to claim 6, wherein the mixed layer comprises a silicide.

15. The method for manufacturing a power storage device according to claim 13, wherein the mixed layer comprises a silicide.

16. The method for manufacturing a power storage device according to claim 6, wherein the mixed layer comprises an alloy of the second metal element and silicon.

17. The method for manufacturing a power storage device according to claim 13, wherein the mixed layer comprises an alloy of the second metal element and silicon.

18. The method for manufacturing a power storage device according to claim 8, wherein the plurality of silicon whiskers is formed over the first portion only.

19. The method for manufacturing a power storage device according to claim 6, wherein a metal oxide layer is formed between the mixed layer and the silicon layer after forming the active material layer.

20. The method for manufacturing a power storage device according to claim 13, wherein a metal oxide layer is formed between the mixed layer and the silicon layer after forming the active material layer.

* * * * *